(12) United States Patent
Saito et al.

(10) Patent No.: US 11,298,975 B2
(45) Date of Patent: Apr. 12, 2022

(54) VEHICLE WHEEL

(71) Applicant: HONDA MOTOR CO., LTD., Tokyo (JP)

(72) Inventors: Toshinobu Saito, Wako (JP); Yusuke Osawa, Wako (JP); Youichi Kamiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 16/553,862

(22) Filed: Aug. 28, 2019

(65) Prior Publication Data

US 2020/0070572 A1     Mar. 5, 2020

(30) Foreign Application Priority Data

Aug. 30, 2018    (JP) .............................. JP2018-161273

(51) Int. Cl.
    *B60B 21/02*       (2006.01)
    *B60C 19/00*       (2006.01)
    *B60B 21/12*       (2006.01)

(52) U.S. Cl.
    CPC ............ *B60B 21/026* (2013.01); *B60B 21/12* (2013.01); *B60C 19/002* (2013.01)

(58) Field of Classification Search
    CPC ...... B60B 21/026; B60B 21/12; B60C 19/002
    See application file for complete search history.

(56) References Cited

U.S. PATENT DOCUMENTS

| | | | |
|---|---|---|---|
| 2008/0277997 A1 | 11/2008 | Kamiyama et al. | |
| 2011/0057505 A1* | 3/2011 | Nagata | B60B 21/12 |
| | | | 301/95.102 |
| 2019/0160866 A1* | 5/2019 | Miura | B60R 13/0861 |

FOREIGN PATENT DOCUMENTS

| | | | | |
|---|---|---|---|---|
| GB | 2509976 A | * | 7/2014 | ............. B60B 21/12 |
| JP | 4551422 B2 | | 9/2010 | |

* cited by examiner

*Primary Examiner* — Scott A Browne
(74) *Attorney, Agent, or Firm* — Rankin, Hill & Clark LLP

(57) ABSTRACT

A vehicle wheel includes: a rim including a well portion and a guide member; and a sub-air chamber member serving as a Helmholtz resonator. The well portion has an outer circumferential surface extending in a wheel circumferential direction of the vehicle wheel. The guide member engages with the sub-air chamber member to guide the sub-air chamber member on the outer circumferential surface in the wheel circumferential direction, thereby to attach the sub-air chamber member to the rim.

3 Claims, 8 Drawing Sheets

VEHICLE WHEEL

CROSS-REFERENCE TO RELATED APPLICATIONS

The present application claims priority under 35 U.S.C. § 119 to Japanese Patent Application No. 2018-161273, filed Aug. 30, 2018, the contents of which are hereby incorporated by reference in their entirety.

BACKGROUND OF THE INVENTION

1. Field of the Invention

The present invention relates to a vehicle wheel.

2. Description of the Related Art

There has been known a wheel including a well portion with an outer circumferential surface and a Helmholtz resonator (sub-air chamber member) that is attached to the outer circumferential surface and cancels air column resonance noises in a tire air chamber (e.g., see Japanese Patent No. 4551422). The sub-air chamber member of the wheel includes a main body portion formed elongated in a wheel circumferential direction and defining a sub-air chamber inside the main body, and a pair of plate-shaped edge portions that are formed on wheel width direction two ends of the main body along the substantially entire length of the main body portion in a longitudinal direction thereof to extend outward in a wheel width direction. The sub-air chamber member is attached to the well portion by distal ends of the pair of edge portions being fitted in groove portions formed in the well portion respectively.

The sub-air chamber member attached to the well portion via the pair of edge portions is curved extending from a bottom of the sub-air chamber member respectively to the pair of edge portions to be convex toward the outer circumferential surface of the well portion, so as to withstand the centrifugal force acting on the sub-air chamber member in a direction in which the sub-air chamber member separates off from the well portion. According to the structure of the sub-air chamber member, although the centrifugal force acts on the curved portions in such a way as to reverse the convex curve in the separating direction (centrifugal direction), the pressing force of the distal ends of the pair of edge portions against the groove portions increases and thus the sub-air chamber member can be retained on the well portion more firmly. In other words, according to the structure of the sub-air chamber member, the larger the centrifugal force, the sub-air chamber member is more firmly retained on the well portion.

SUMMARY OF THE INVENTION

However, according to the structure of the conventional wheel with the sub-air chamber member (e.g., see Japanese Patent No. 4551422), the bottom of the sub-air chamber member is curved to be convex toward the outer circumferential surface of the well portion and is longitudinally curved along the wheel circumferential direction.

This structure of the conventional wheel makes it difficult to cause the sub-air chamber member, in particular the edge portions thereof, to be elastically deformed when attaching the sub-air chamber member to the well portion by fitting the edge portions of the sub-air chamber member into the groove portions of the well portion. Therefore, due to the structure of the conventional wheel, the sub-air chamber member needs to be attached to the well portion by pressing the pair of edge portions of the sub-air chamber member against the outer circumferential surface of the well portion using a large mechanical force produced by a pusher or the like.

An object of the present invention is to provide a vehicle wheel with a well portion which is excellent in retaining a sub-air chamber member and to which the sub-air chamber member can be attached in a simpler manner than the conventional vehicle wheel.

A vehicle wheel according to the embodiment of the present invention includes: a rim including a well portion and a guide member; and a sub-air chamber member serving as a Helmholtz resonator. The well portion has an outer circumferential surface extending in a wheel circumferential direction of the vehicle wheel. The guide member engages with the sub-air chamber member to guide the sub-air chamber member on the outer circumferential surface in the wheel circumferential direction, thereby to attach the sub-air chamber member to the rim.

The present invention provides a vehicle wheel with a well portion which is excellent in retaining a sub-air chamber member and to which the sub-air chamber member can be attached in a simpler manner than the conventional method.

DETAILED DESCRIPTION OF THE EMBODIMENTS

Next, a vehicle wheel according to an embodiment of the present invention will be described in detail with reference to the drawings as appropriate. In the referenced drawings, "X" indicates a wheel circumferential direction, "Y" indicates a wheel width direction, and "Z" indicates a wheel radial direction.

A major feature of the vehicle wheel according to the present embodiment is that the vehicle wheel includes a rim with guide members that guide sub-air chamber members, which serve as Helmholtz resonators, in the wheel circumferential direction.

Hereinafter, a description will be given of the whole structure of the vehicle wheel and then a description will be given of the sub-air chamber members and the guide members.

Overall Configuration of Vehicle Wheel

Figure 1:
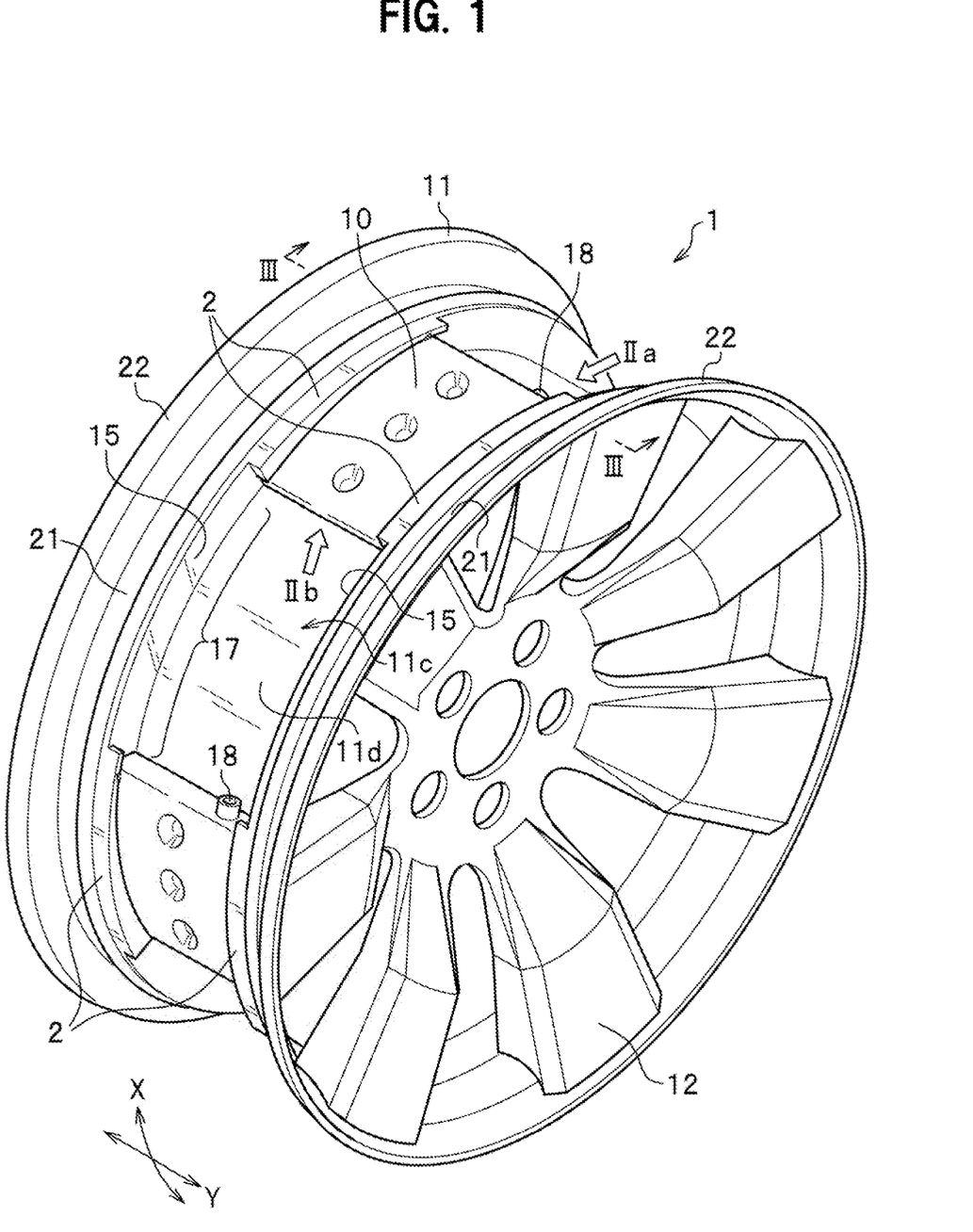
FIG. 1 is a perspective view of a vehicle wheel according to an embodiment of the present invention.

FIG. 1 is a perspective view of a vehicle wheel 1 according to an embodiment of the present invention.

As shown in FIG. 1, the vehicle wheel 1 according to the present embodiment has a rim 11 and sub-air chamber members 10 (Helmholtz resonators) attached to the rim 11. The rim 11 is made of a metal such as an aluminum alloy or a magnesium alloy. The sub-air chamber members 10 are made of a flexible resin such as polypropylene or polyamide.

In FIG. 1, the reference numeral 12 denotes a disc for coupling the rim 11 to a hub not illustrated; the reference numeral 18 denotes the later-described tube body of each sub-air chamber member 10; and the reference numeral 2 denotes each guide member.

The rim 11 has widthwise end portions which are located opposite each other in the wheel width direction Y and at each of which a bead seat 21 is formed. The rim 11 has a well portion 11c recessed toward a wheel axis in the wheel radial direction between the bead seats 21. A bottom surface of this recess defines an outer circumferential surface 11d of the well portion 11c. The outer circumferential surface 11d has a substantially constant diameter about the wheel axis along the wheel width direction Y.

The rim 11 includes a pair of rising portions 15 that rise toward rim flanges 22 of the rim 11 respectively from widthwise ends of the outer circumferential surface 11d of the well portion 11c which are located opposite each other in the wheel width direction Y. The rim 11 rises from the rising portions 15 via the bead seats 21 outward in the wheel width direction Y toward the rim flanges 22.

Sub-Air Chamber Member

Next, a description will be given of the sub-air chamber members 10.

Figure 2A:
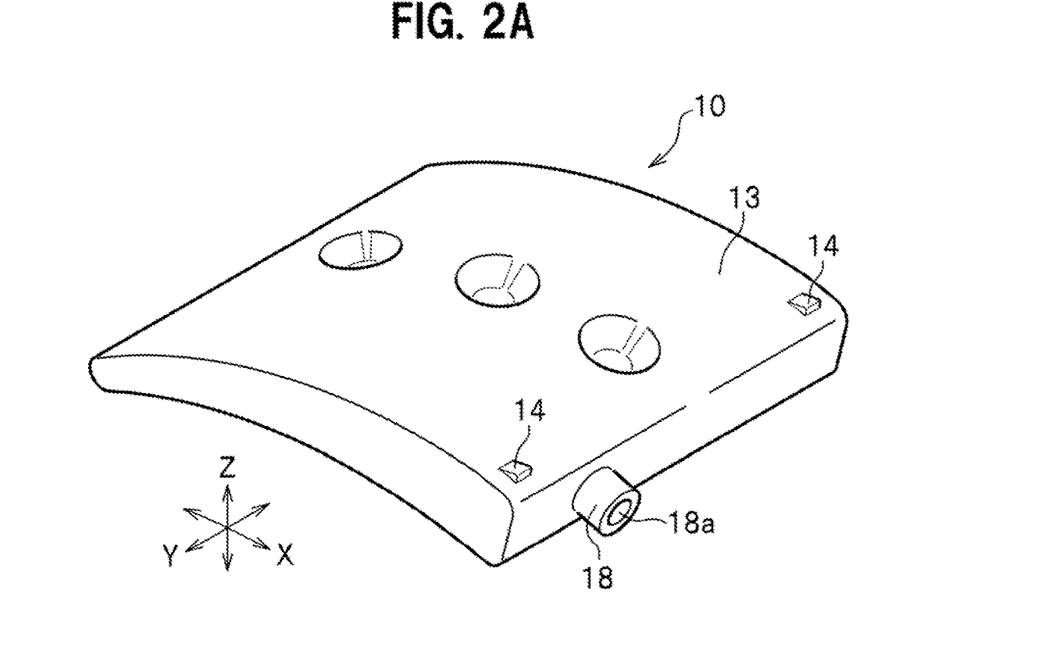
FIGS. 2A and 2B are each an overall perspective view of a sub-air chamber member.
Figure 2B:
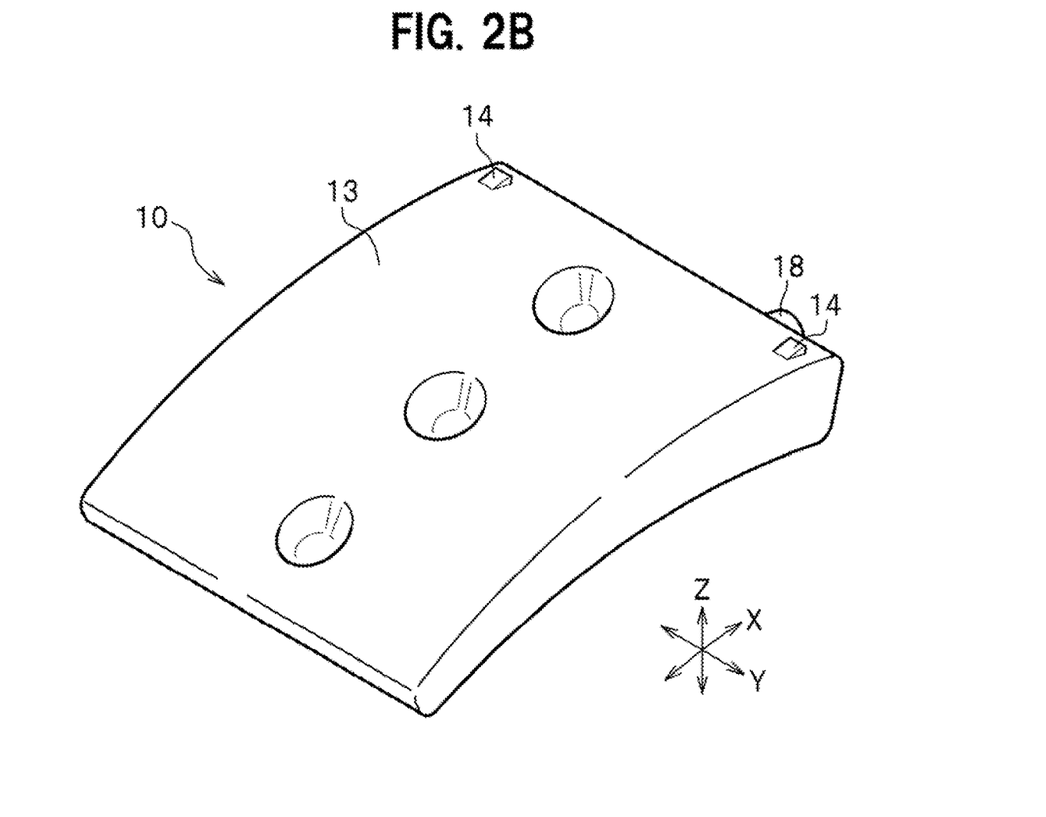
Figure 3:
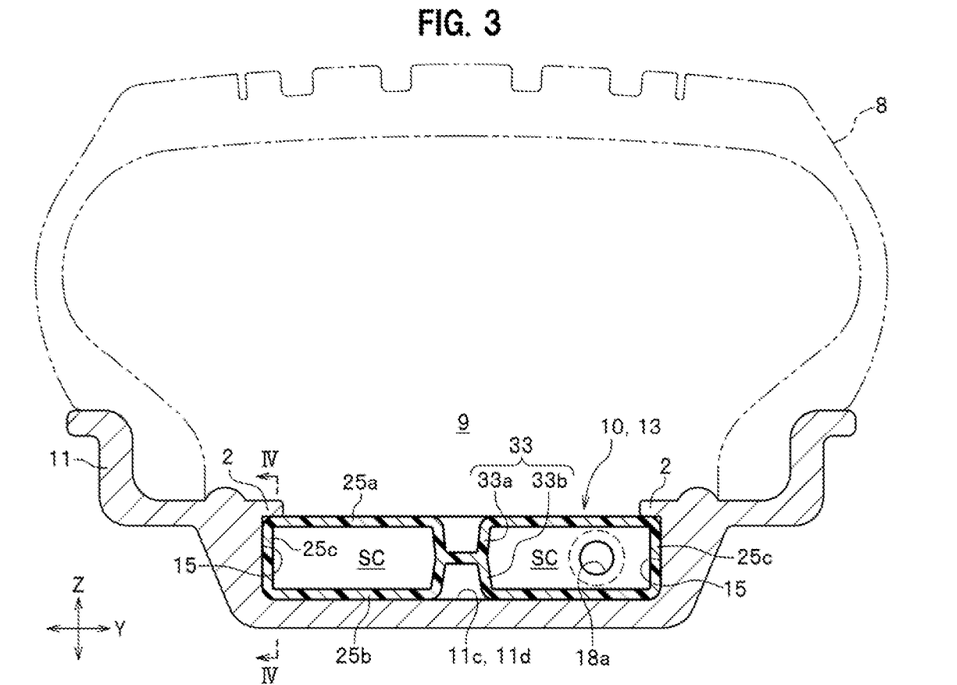
FIG. 3 is a cross-sectional view taken along line in FIG. 1.

FIGS. 2A and 2B are each an overall perspective view of each sub-air chamber member 10. FIG. 2A is a perspective view seen from the direction IIa indicated in FIG. 1. FIG. 2B is a perspective view seen from the direction IIb indicated in FIG. 1. FIG. 3 is a cross-sectional view taken along line III-III in FIG. 1.

As shown in FIGS. 2A and 2B, each sub-air chamber member 10 is a hollow member with a rectangular shape in plan view and includes a main body portion 13 and a tube body 18. The vehicle wheel 1 shown in FIG. 1 has four sub-air chamber members 10 arranged at regular intervals in the wheel circumferential direction X. Note that only two of the sub-air chamber members 10 are shown in FIG. 1 for the convenience of drawing and illustration of the other two is omitted.

The sub-air chamber members 10 of the vehicle wheel 1 are arranged is such a way that the tube bodies 18 are positioned at 90-degree intervals about an axis of wheel rotation. With this arrangement, the vehicle wheel 1 can uniformly cancel the resonance noise generated in the tire air chamber and having a predetermined resonance frequency.

However, the number of the sub-air chambers SC and the positions of the tube bodies 18 are not limited thereto. When the number of the sub-air chambers SC is two, the respective tube bodies 18 can be arranged at positions spaced at a 90-degree interval about the wheel rotation axis. When the number of the sub-air chambers SC is three or five or more, the tube bodies 18 can be arranged at regular intervals in the wheel circumferential direction X.

As shown in FIGS. 2A and 2B, the main body portion 13 is curved along the wheel circumferential direction X. In other words, the main body portion 13 extends in the wheel circumferential direction X when the sub-air chamber member 10 is attached to the outer circumferential surface 11d of the well portion 11c (see FIG. 1).

The main body portion 13 according to the present embodiment has one circumferential end on which the tube body 18 is formed and the other circumferential end which are located opposite each other in the wheel circumferential direction X. The main body portion 13 has a thickness (height in the wheel radial direction Z) gradually decreasing from the one circumferential end toward the other circumferential end. In other words, the main body portion 13 has a tapered shape tapered from the one circumferential end toward the other circumferential end in side view seen in the wheel width direction Y.

The main body portion 13 has an upper surface (radially outer surface located outward in the wheel radial direction Z) on which engaging projections 14 are formed near the one circumferential end. The engaging projections 14 are to be engaged with the later-described guide members 2 (see FIG. 1).

The engaging projections 14 are formed in a pair, at widthwise end portions of the main body portion 13 which are located opposite each other in the wheel width direction Y.

Each engaging projection 14 according to the present embodiment has a wedge-like shape with a height gradually decreasing toward the tapered end portion of the main body portion 13, defining an inclined surface. However, the shape of the engaging projections 14 are not limited thereto. Each engaging projection 14 may be constituted by a projection that stands on the upper surface (radially outer surface located outward in the wheel radial direction Z) of the main body portion 13, which projection may take various shapes, such as a rectangular column, an n-gonal pyramid, a truncated n-gonal pyramid, a column, a cone, a truncated cone and the like.

As shown in FIG. 3, the main body portion 13 has a substantially rectangular shape elongated in the wheel width direction Y in a cross-sectional view orthogonal to the wheel circumferential direction X shown in FIG. 1.

The main body portion 13 has a hollow space inside. This hollow space defines a sub-air chamber SC.

The main body portion 13 includes a bottom plate 25b extending in the wheel width direction Y in contact with the outer circumferential surface 11d of the well portion 11c and having widthwise ends located opposite each other in the wheel width direction Y, an upper plate 25a which is located opposite the bottom plate 25b and above the outer circumferential surface 11d, and a pair of side plates 25c respectively rising from the widthwise ends of the bottom plate 25b and joined to the upper plate 25a.

The bottom plate 25b is a plate body that extends substantially flat in the wheel width direction Y. This bottom plate 25b is curved in the wheel circumferential direction X (see FIG. 1) with substantially the same curvature as the curvature of the outer circumferential surface 11d.

The upper plate 25a is curved in the wheel circumferential direction X (see FIG. 1) with a predetermined curvature in such a way as to face the bottom plate 25b while keeping a predetermined distance therefrom.

The side plates 25c rise outward in the wheel radial direction Z from the bottom plate 25b substantially perpendicularly to the outer circumferential surface 11d of the well portion 11c.

These upper plate 25a, bottom plate 25b, and side plates 25c define the sub-air chamber SC inside the main body portion 13 in such a way as to surround the sub-air chamber SC.

As shown in FIGS. 2A and 2B, the main body portion 13 includes multiple (in the present embodiment, three) bridges 33 aligned at regular intervals in the wheel circumferential direction X. These bridges 33 are aligned in one row in the wheel circumferential direction X.

As shown in FIG. 3, each bridge 33 has an upper joining portion 33a and a lower joining portion 33b which are joined to each other at a substantially center position between the upper plate 25a and the bottom plate 25b.

The upper joining portion 33a is a portion of the upper plate 25a that is partially recessed toward the bottom plate 25b. The lower joining portion 33b is a portion of the bottom plate 25b that is partially recessed toward the upper plate 25a.

Each of the bridges 33 has a circular cylindrical shape and partially connects between the upper plate 25a and the bottom plate 25b. Each bridge 33 has openings each having a circular shape in plan view at portions of the main body portion 13 which are opposite to each other in the wheel radial direction Z.

Next, a description will be given of the tube body 18 (see FIG. 1).

As shown in FIG. 1, each tube body 18 is formed on the one circumferential end of the main body portion 13 at a location near one wheel width direction Y end, so as to project from the main body portion 13 in the wheel circumferential direction X.

As shown in FIG. 2B, the tube body 18 has a communication hole 18a defined therein.

As shown in FIG. 3, the communication hole 18a allows communication between the sub-air chamber SC formed inside the main body portion 13 and a tire air chamber 9 that is formed above the well portion 11c between the well portion 11c and a tire 8 (not shown).

The sub-air chamber member 10 of the present embodiment is a blow-molded product using a synthetic resin such as a polyamide resin as mentioned earlier. Here, although the synthetic resin is not limited to a particular type, it is particularly preferable to use a polyamide resin in which polyamide MXD6 is used as a base resin or a nylon 6.

Guide Member

Next, a description will be given of the guide member 2.

As shown in FIG. 1, the guide members 2 each extends in the wheel circumferential direction X in such a way as to guide the corresponding sub-air chamber member 10 in the wheel circumferential direction X.

As shown in FIG. 3, the guide members 2 according to the present embodiment are formed along upper edges (radially outer edges located outward in the wheel radial direction Z) of the rising portions 15 of the well portion 11c.

As shown in FIG. 1, the guide members 2 according to the present embodiment are respectively formed on the pair of rising portions 15 located opposite to each other in the wheel width direction Y across the well portion 11c. The guide members 2 are each formed in an eave-like shape and respectively project from the upper edges of the rising portions 15 inward in the wheel width direction Y.

Figure 4:
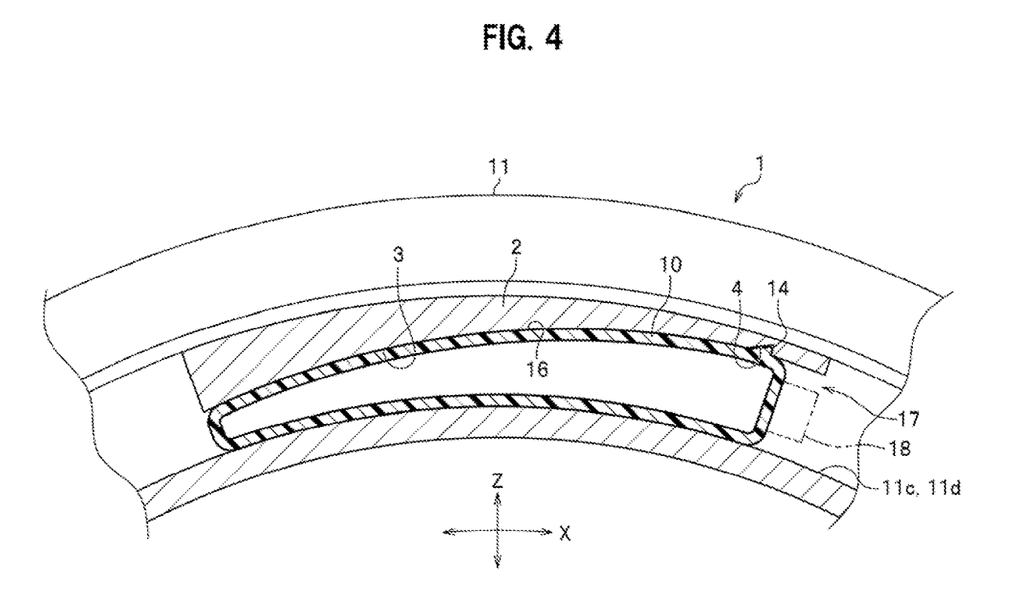
FIG. 4 is a cross-sectional view taken along line IV-IV in FIG. 3.

FIG. 4 is a cross-sectional view taken along line IV-IV in FIG. 3.

As shown in FIG. 4, each guide member 2 has a radially inner surface 3 located inward in the wheel radial direction Z (hereinafter referred to as wheel radial direction inner surface 3); and each sub-air chamber member 10 has a radially outer surface 16 (hereinafter referred to as wheel radial direction outer surface 16) located outward in the wheel radial direction Z. The wheel radial direction inner surface 3 faces the wheel radial direction outer surface 16.

When the sub-air chamber member 10 is installed at a predetermined position on the outer circumferential surface 11d of the well portion 11c, the wheel radial direction inner surface 3 of the guide member 2 comes into abutment with the wheel radial direction outer surface 16 of the sub-air chamber member 10. More in detail, the wheel radial direction inner surface 3 of the guide member 2 has an arc that is concave in the radially inward direction; the wheel radial direction outer surface 16 of the sub-air chamber member 10 has an arc that is convex in the radially outward direction; and their arc shapes correspond to each other.

Each guide member 2 has a hole 4 which is located corresponding to corresponding one of the engaging projections 14 of the sub-air chamber member 10 and into which the corresponding one of the engaging projections 14 is fitted. The hole 4 has a shape corresponding to the shape of the engaging projection 14.

The sub-air chamber member 10 is fixed at a predetermined position by the engaging projections 14 being fitted into the holes 4. Note that, in FIG. 4, the reference numeral 18 denotes a tube body represented by an imaginary line (alternate long and two short dashed line).

The rim 11 has installation openings 17 defined therein between the wheel radial direction inner surfaces 3 of the guide members 2 and the outer circumferential surface 11d of the well portion 11c, through which installation openings 17 the sub-air chamber members 10 are respectively installed.

As shown in FIG. 1, each installation opening 17 according to the present embodiment corresponds to a gap between adjacent ones of the guide members 2 extending in the wheel circumferential direction X, i.e., a region of the rising portions 15 extending in the wheel circumferential direction X, in which region the guide members 2 are not formed.

Method of Attaching Sub-Air Chamber Member

Next, a description will be given of a method of attaching each sub-air chamber member 10 to the rim 11 (see FIG. 1).

Figure 5A:
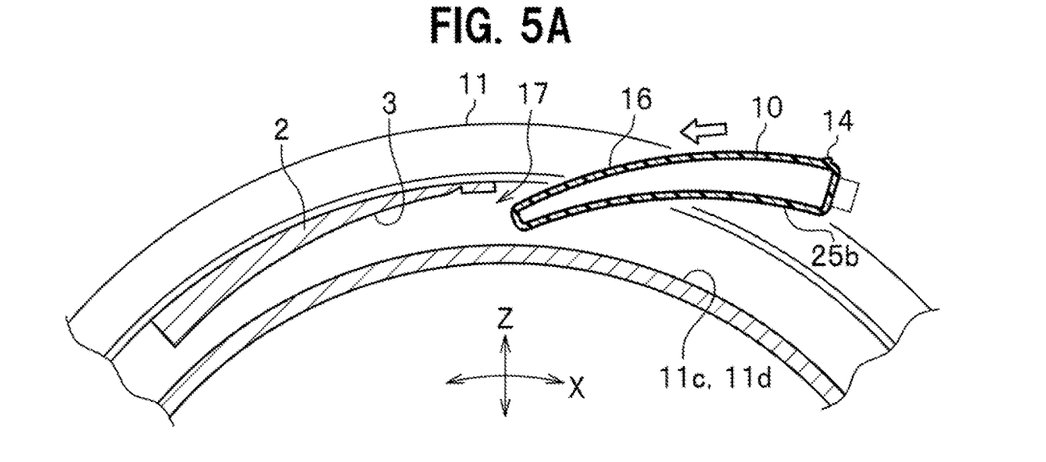
FIGS. 5A to 5C are cross-sectional views for explaining processes for attaching the sub-air chamber member to a rim, each corresponding to the cross-sectional view shown in FIG. 4.
Figure 5B:
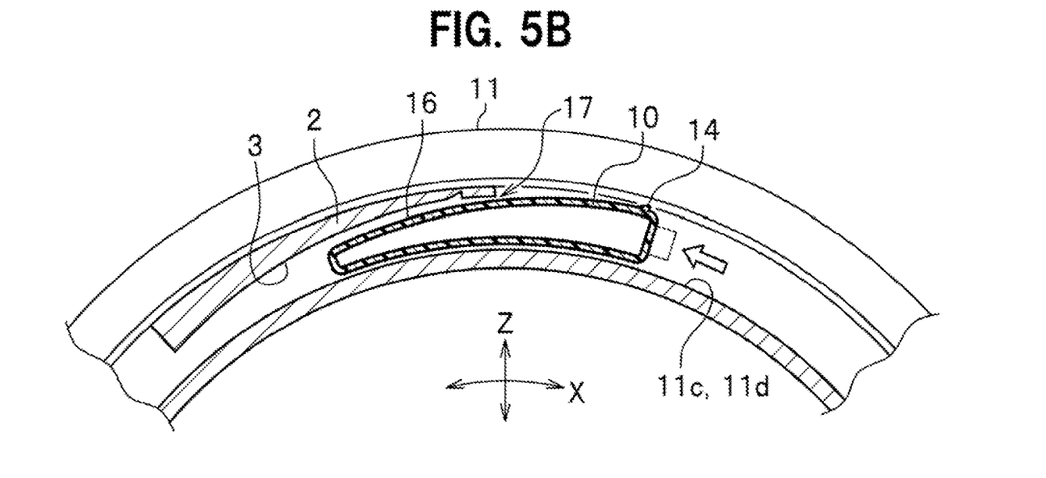
Figure 5C:
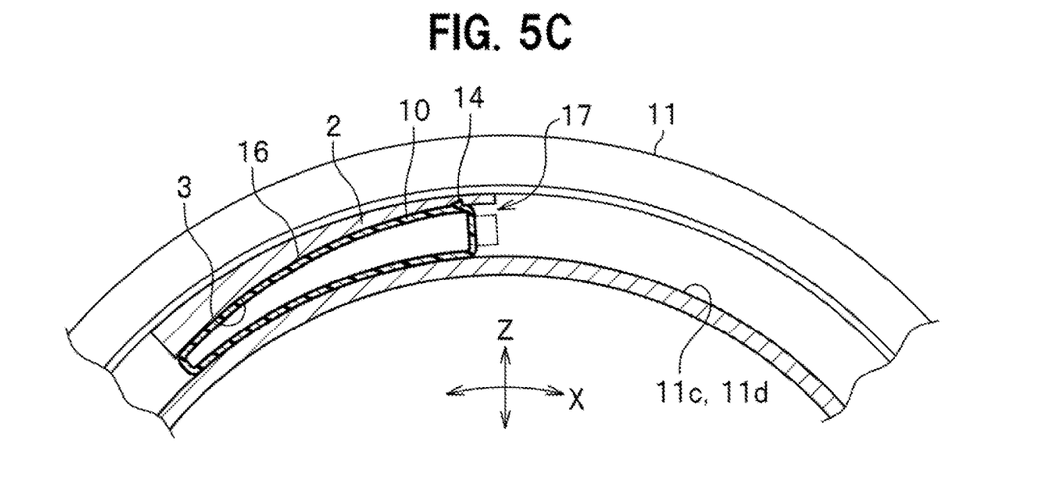

FIGS. 5A to 5C are cross-sectional views for explaining processes for attaching the sub-air chamber member 10 to the rim 11, each corresponding to the cross-sectional view shown in FIG. 4.

In this attachment method, firstly, the sub-air chamber member 10 is arranged in such a way that the bottom plate 25b thereof faces the outer circumferential surface 11d of the well portion 11c, as shown in FIG. 5A.

Subsequently, the tapered end portion of the sub-air chamber member 10 is inserted into one of the installation openings 17 formed in the rim 11.

Then, as the sub-air chamber member 10 is made to slide into between the wheel radial direction inner surface 3 of the corresponding guide member 2 and the outer circumferential surface 11d of the well portion 11c as shown in FIG. 5B, the wheel radial direction outer surface 16 of the sub-air chamber member 10 comes into abutment with the wheel radial direction inner surface 3 of the guide member 2 as shown in FIG. 5C.

In this event, each engaging projection 14 of the sub-air chamber member 10 comes into abutment with an end portion of the guide member 2 that defines the installation opening 17, and is deformed downward (inward in the wheel radial direction Z) while causing elastic deformation of the sub-air chamber member 10. After that, the shape of the engaging projection 14 is restored and the engaging projection 14 comes fitted into the hole 4 as shown in FIG. 4 at a position where the wheel radial direction outer surface 16 of the sub-air chamber member 10 comes into abutment with the wheel radial direction inner surface 3 of the guide member 2.

At this end, the sub-air chamber member 10 is fixed at a predetermined position and the series of processes of the attaching method is finished.

Operations and Advantageous Effects

Next, a description will be given of operations and advantageous effects of the vehicle wheel 1 according to the present embodiment.

The vehicle wheel 1 according to the present embodiment includes the guide members 2 that can engage with the sub-air chamber members and guide the sub-air chamber members 10 in the wheel circumferential direction X.

Each sub-air chamber member 10 is attached to the rim 11 of the vehicle wheel 1 by being made to slide in the direction in which the guide members 2 of the vehicle wheel 1 extends and thereby engage with the guide members 2.

Therefore, according to the structure of the vehicle wheel 1, unlike the conventional vehicle wheels (e.g., see Japanese Patent No. 4551422), the sub-air chamber member 10 can be attached to the rim 11 extremely easily, without the help of a tool such as a pusher that provides a mechanical force.

The vehicle wheel 1 is excellent in retaining the sub-air chamber member 10 when a centrifugal force acts thereon, by the sub-air chamber member 10 being engaged with the guide members 2.

Each guide member 2 of the vehicle wheel 1 according to the present embodiment has the wheel radial direction inner surface 3 facing the wheel radial direction outer surface 16 of the sub-air chamber member 10.

According to this structure of the vehicle wheel 1, the wheel radial direction inner surface 3 of the guide member 2 comes into abutment with the wheel radial direction outer surface 16 of the sub-air chamber member 10. This improves the performance of retaining the sub-air chamber member 10 when the centrifugal force acts thereon.

According to the structure of the vehicle wheel 1, the wheel radial direction inner surface 3 of the guide member 2 and the outer circumferential surface 11$d$ of the well portion 11$c$ define a distance therebetween that gradually decreases from the corresponding installation opening 17 in the direction in which the sub-air chamber member 10 is installed. The sub-air chamber member 10 has a wheel radial direction Z height that gradually decreases in the installation direction corresponding to the distance between the wheel radial direction inner surface 3 of the guide member 2 and the outer circumferential surface 11$d$ of the well portion 11$c$.

This structure of the vehicle wheel 1 facilitates installation of the sub-air chamber member 10 into between the wheel radial direction inner surface 3 of the guide member 2 and the outer circumferential surface 11$d$ of the well portion 11$c$.

Although an embodiment of the present invention has been described, the present invention is not limited to the embodiment described above and can be carried out in various modes.

Figure 6A:
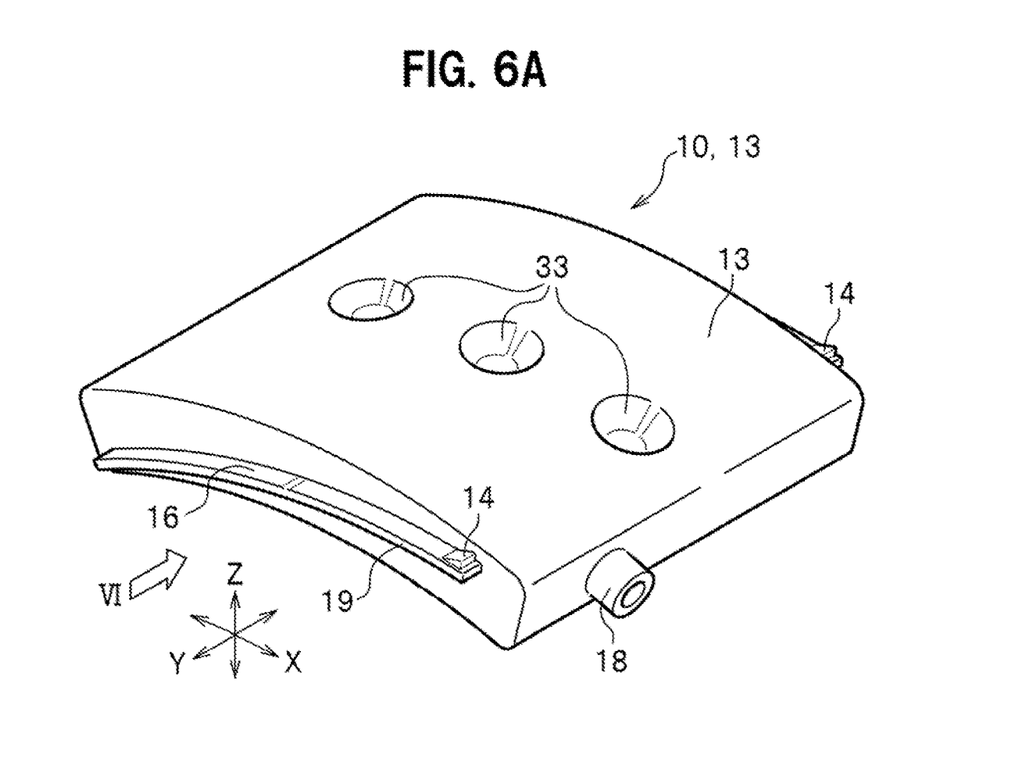
FIG. 6A is an overall perspective view of a sub-air chamber member of a vehicle wheel according to a first modification.
Figure 6B:
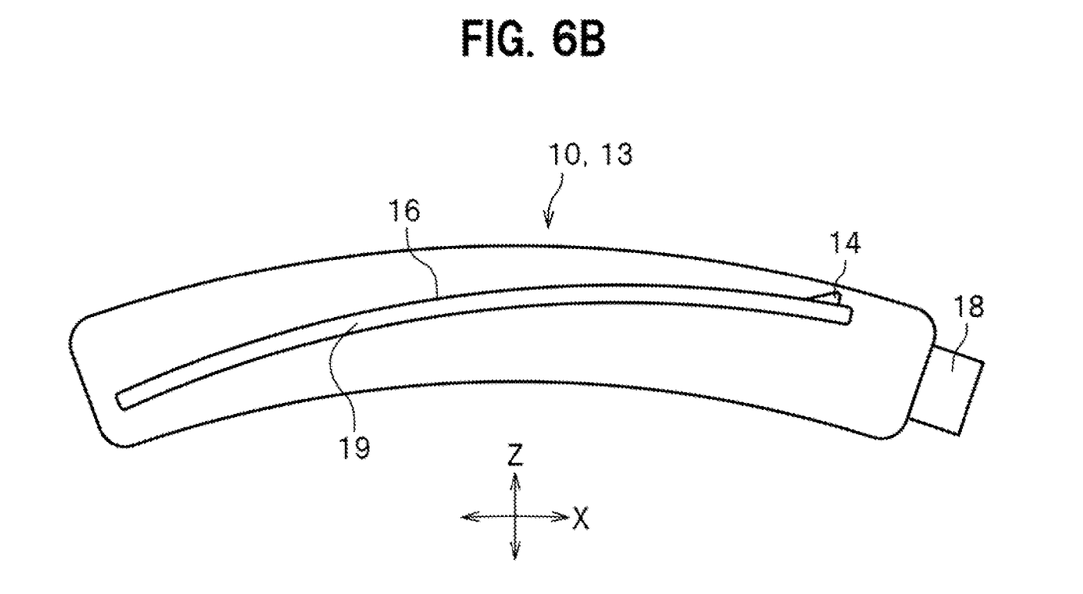
FIG. 6B is a side view of the sub-air chamber member, as seen in the direction indicated by the arrow VI in FIG. 6A.
Figure 7:
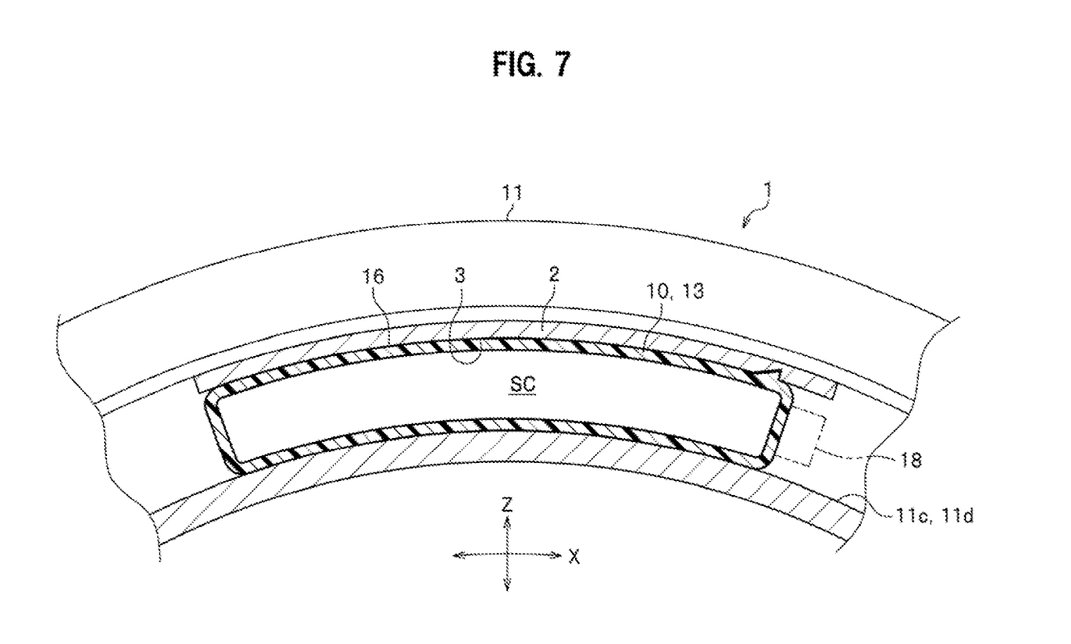
FIG. 7 is a cross-sectional view of a vehicle wheel according to a second modification, corresponding to the cross-sectional view shown in FIG. 4.
Figure 8:
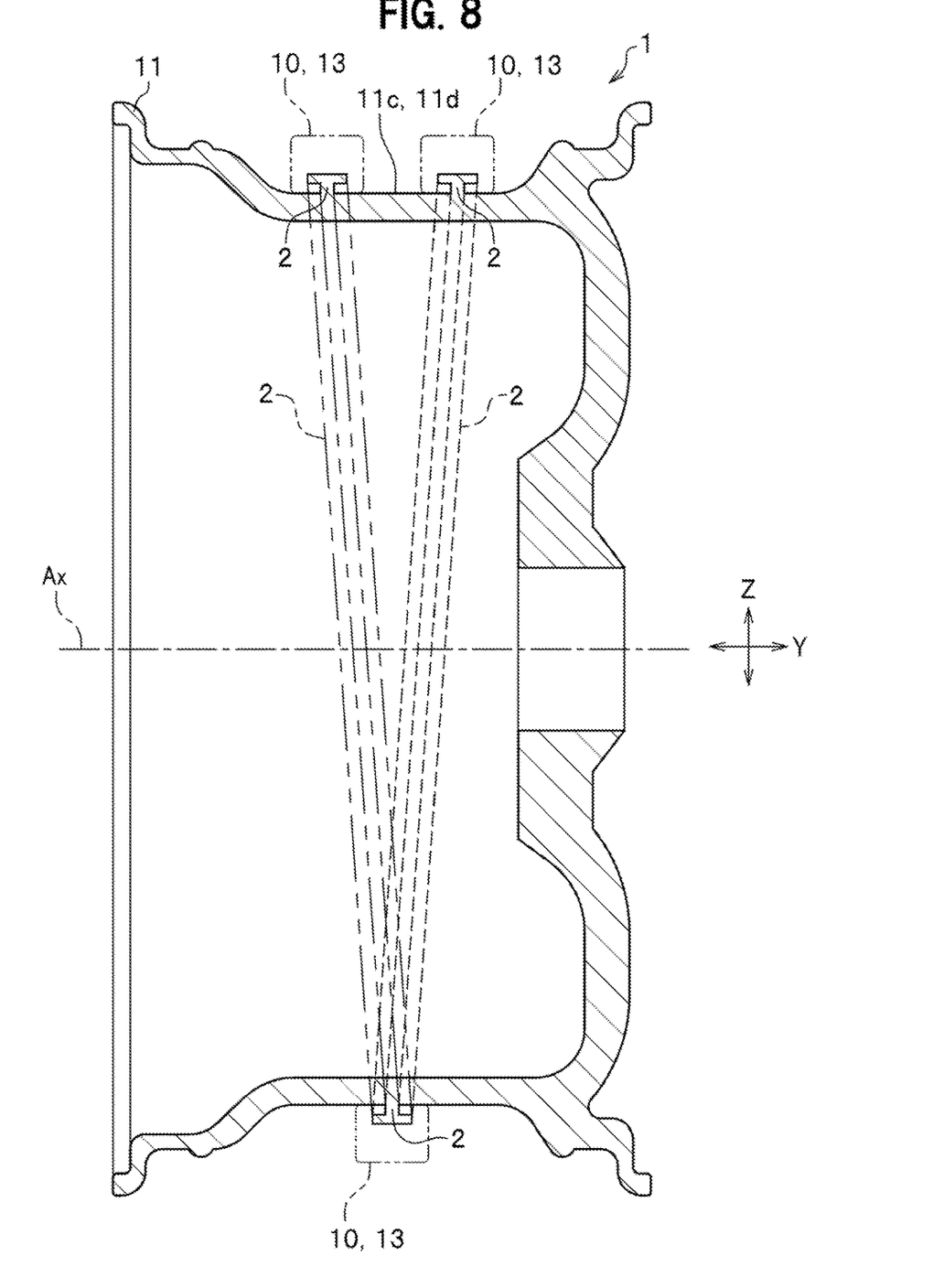
FIG. 8 is a cross-sectional view of a vehicle wheel according to a third modification, taken along a plane including the rotation axis of the vehicle wheel.

FIG. 6A is an overall perspective view of a sub-air chamber member 10 of a vehicle wheel 1 according to a first modification. FIG. 6B is a side view of the sub-air chamber member 10, as seen in the direction indicated by the arrow VI in FIG. 6A. FIG. 7 is a cross-sectional view of a vehicle wheel 1 according to a second modification, corresponding to the cross-sectional view shown in FIG. 4. FIG. 8 is a cross-sectional view of a vehicle wheel 1 according to a third modification, taken along a plane including the wheel rotation axis Ax of the vehicle wheel 1.

Note that constituent elements shown in FIGS. 6A, 6B, 7 and 8 which are the same as those in the above-described embodiment are denoted by the same reference numerals and detailed descriptions thereof will be omitted.

As shown in FIGS. 6A and 6B, the sub-air chamber member 10 of the vehicle wheel 1 according to the first modification has two side surfaces which are located opposite each other in the wheel width direction Y and each of which has a rib 19 formed thereon extending in the wheel circumferential direction X.

Note that in FIGS. 6A and 6B, only one rib 19 is illustrated for the convenience of illustration and illustration of the other rib 19 is omitted.

The ribs 19 are formed so as to face the wheel radial direction inner surface 3 of the guide member 2 (see FIG. 4).

Specifically, when the sub-air chamber member 10 is arranged at a predetermined position on the outer circumferential surface 11$d$ of the well portion 11$c$ (see FIG. 1), the wheel radial direction inner surfaces 3 of the guide members 2 (see FIG. 4) comes into abutment with the wheel radial direction outer surfaces 16 of the ribs 19. Here, the wheel radial direction outer surface 16 of each rib 19 corresponds to the "wheel radial direction outer surface" of the sub-air chamber member described in the claims.

The sub-air chamber member 10 according to the first modification has a thickness in the wheel radial direction Z, i.e., a height from the outer circumferential surface 11$d$ (see FIG. 1) in the wheel radial direction Z, which is constant along the wheel circumferential direction X, unlike the tapered sub-air chamber member 10 according to the above-described embodiment (see FIG. 2).

With this structure of the vehicle wheel 1 according to the first modification, the guide member 2 (see FIG. 4) guides the sub-air chamber member 10 in the wheel circumferential direction X while being in abutment with the rib 19. Therefore, the height of the sub-air chamber member 10 can be designed irrespective of the height of the guide member 2 (see FIG. 4). Therefore, the sub-air chamber member 10 according to the first modification can be configured to have a sub-air chamber (not shown) with a larger volume than the sub-air chamber SC of the sub-air chamber member 10 according to the above-described embodiment (see FIG. 3). Therefore, the sub-air chamber member 10 according to the first modification provides improved noise cancelling performance compared to the sub-air chamber member 10 according to the above-described embodiment.

As shown in FIG. 7, a guide member 2 of the vehicle wheel 1 according to the second modification has a wheel radial direction inner surface 3 in parallel with the outer circumferential surface 11$d$ of the well portion 11$c$.

With this structure of the vehicle wheel 1, the sub-air chamber member 10 according to the second modification can be configured to have a sub-air chamber with a larger volume than the sub-air chamber SC of the sub-air chamber member 10 according to the above-described embodiment (see FIG. 3). Therefore, the sub-air chamber member 10 according to the second modification provides improved noise cancelling performance compared to the sub-air chamber member 10 according to the above-described embodiment (see FIG. 3).

The vehicle wheel 1 according to the third modification includes a rail-like guide member 2 which is formed on the outer circumferential surface 11$d$ of the well portion 11$c$ and which guides the sub-air chamber member 10 in the wheel circumferential direction X (see FIG. 1). In FIG. 8, the main body portion 13 of the sub-air chamber member 10 guided by the guide member 2 is indicated by an imaginary line (alternate long and two short dashed line).

In FIG. 8, the guide member 2 is drawn in two parts, one with imaginary lines (alternate long and two short dashed lines) and the other with hidden lines (dashed lines). The part drawn with the imaginary lines extends on the outer circumferential surface 11d on the front side of the drawing sheet of FIG. 8. The part drawn with the hidden lines extends on the outer circumferential surface 11d on the back side of the drawing sheet of FIG. 8.

The guide member 2 extends in a direction defining a predetermined angle with the wheel rotation axis Ax in such a way as to form a thread pitch of a screw.

The sub-air chamber member 10 includes a groove (not shown) that engages with the guide member 2.

The sub-air chamber member 10 is made to receive one end portion of the rail-like guide member 2 in the groove of the sub-air chamber member 10. Then, the sub-air chamber member 10 is made to slide along the direction in which the guide member 2 extends so that the guide member 2 is inserted through the groove of the sub-air chamber member 10 over the entire length of the groove. In this way, the sub-air chamber member 10 is attached to the rim 11 via the guide member 2.

Although illustration is omitted, the pairs of guide members 2 of the vehicle wheel 1 according to the above-described embodiment and the first and second modifications may be replaced with plate bodies which are attached to and between the upper edges of the opposite rising portions 15 over the outer circumferential surface 11d of the well portion 11c at predetermined intervals. With this vehicle wheel 1 with such plate bodies serving as guide members, each sub-air chamber member 10 is made to slide into and between the corresponding guide member and the outer circumferential surface 11d to be attached to the rim 11.

What is claims is:

1. A vehicle wheel comprising:
    a rim comprising a well portion and a guide member, the well portion having an outer circumferential surface extending in a wheel circumferential direction of the vehicle wheel; and
    a sub-air chamber member serving as a Helmholtz resonator,
    wherein the guide member engages with the sub-air chamber member to guide the sub-air chamber member on the outer circumferential surface in the wheel circumferential direction, thereby to attach the sub-air chamber member to the rim,
    wherein the sub-air chamber member has a wheel radial direction outer surface,
    wherein the guide member has a wheel radial direction inner surface extending in the wheel circumferential direction and facing the wheel radial direction outer surface of the sub-air chamber member,
    wherein the rim has an installation opening which is defined by and between the wheel radial direction inner surface of the guide member and the outer circumferential surface of the well portion and through which the sub-air chamber member is installed in the wheel circumferential direction,
    wherein the wheel radial direction inner surface of the guide member and the outer circumferential surface of the well portion define a distance therebetween that gradually decreases from the installation opening in the wheel circumferential direction in which the sub-air chamber member is installed, and
    wherein the sub-air chamber member has a wheel radial direction height that gradually decreases in the wheel circumferential direction corresponding to the distance between the wheel radial direction inner surface of the guide member and the outer circumferential surface of the well portion.

2. The vehicle wheel according to claim 1,
    wherein the sub-air chamber member has two side surfaces which are located opposite each other in the wheel width direction and on each of which a rib extending in the wheel circumferential direction is formed, and
    wherein the wheel radial direction outer surface of the sub-air chamber member is constituted by wheel radial direction outer surfaces of the ribs.

3. The vehicle wheel according to claim 1,
    wherein the sub-air chamber member has engaging projections which are formed on the wheel radial direction outer surface of the sub-air chamber member and which are to be engaged with the guide member.

* * * * *